(No Model.)
A. J. HELLINGS.
COMBINATION GAGE.
No. 310,420. Patented Jan. 6, 1885.
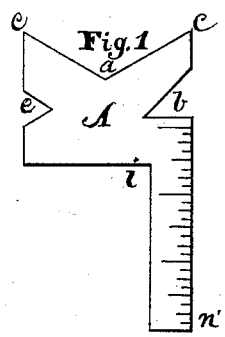
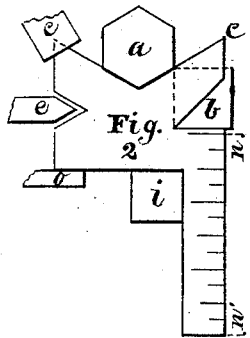
Witnesses
B. Robinson
C. Diley
Inventor
Andrew J. Hellings
Robt. C. Barrie Atty.

UNITED STATES PATENT OFFICE.

ANDREW J. HELLINGS, OF PHILADELPHIA, PENNSYLVANIA.

COMBINATION-GAGE.

SPECIFICATION forming part of Letters Patent No. 310,420, dated January 6, 1885.

Application filed March 8, 1884. (No model.)

*To all whom it may concern:*

Be it known that I, A. J. HELLINGS, a citizen of the United States, residing at Philadelphia, in the county of Philadelphia and State of Pennsylvania, have invented certain new and useful Improvements in Combination-Gages, of which the following is a description.

This invention relates to that class of devices which are used by mechanics in truing up work of different forms, and it has for its object to furnish a gage for square corners, hexagonal corners, and equilateral triangles, for finding the center of a square, for measuring the angle of a center hole, and for measuring the depth of apertures. I am aware that gages for trying squares and angles of sixty degrees, also narrow rules for measuring, are common; and I do not claim any single feature here shown as entirely new; but my invention shows a different combination and arrangement of these parts from any before known, as hereinafter described and claimed, reference being had to the accompanying drawings, in which—

Figure 1 is a plan view of my gage, and Fig. 2 is a similar view showing the same gage and same kinds of work to which it is applicable.

A represents the body of the gage, usually made of thin sheet-steel, and cut into shape by first punching and afterward milling, filing, &c., in the methods common to such work. At $i$ is an inturned right angle for trying square corners. At $a$ is an angle of one hundred and twenty degrees for trying the corners of nuts and other hexagons. At $e$ is an angle of sixty degrees for trying the points of screw-threading tools. Along the edge $n'$ is a graduated scale representing fractions of an inch. This, being a narrow strip, may be inserted into apertures to measure their depth. All the above parts taken singly are common and perform no new service here; but the angle, $b$, of forty-five degrees, formed as a gage-plate, I suppose to be new. This angle is particularly serviceable in finding the center of squares. By placing one side of the forty-five-degree angle against the side of a square with its apex at the corner of the square, the opposite side of the angle will be in a line crossing the center of the square. Now, by marking this line and afterward placing the forty-five-degree angle in a similar manner at one of the adjacent corners of the square, and marking the diagonal formed by the gage, it will be found that the two marks made cross each other at the center of the square, thus giving the result desired. The open angle, $a$, of one hundred and twenty degrees causes a solid angle of sixty degrees at each corner $c$. An angular sixty-degree gage is not new, but when formed with one side coincident with the long side of the gage it serves to rest against the line of a screw in a lathe, the opposite side of the sixty-degree angle then being a guide to one cutting-edge of a threading-tool. The angles $c$ may also be inserted into center holes to ascertain whether they are acute, obtuse, or correct, so as to fit the lathe-centers, which are usually sixty degrees. This gage may be carried in the pocket, combining in convenient form nearly all the gages needed for common use by the mechanic.

What I claim as my invention, and desire to secure by Letters Patent, is—

The combination, in a gage formed of sheet metal, of a straight narrow portion having the graduations $n'$, and the body portion forming a right angle, $i$, therewith, the internal angles of sixty degrees in one side, $e$, forty-five degrees in the other side, $b$, and one hundred and twenty degrees in the end, $a$, and the solid angles of sixty degrees at each of the corners $c$, as shown and described, for the purpose specified.

A. J. HELLINGS.

Witnesses:
C. CREMEN,
R. C. BARRIE.